United States Patent [19]

Asuka et al.

[11] Patent Number: 5,010,830
[45] Date of Patent: Apr. 30, 1991

[54] PROCESS AND APPARATUS FOR INCINERATING WET REFUSE

[75] Inventors: Masahiro Asuka; Shinjiro Yokota; Makoto Tonogouchi; Mitsuo Kasai, all of Ube, Japan

[73] Assignee: Ube Industries, Inc., Japan

[21] Appl. No.: 549,641

[22] Filed: Jul. 6, 1990

Related U.S. Application Data

[63] Continuation of Ser. No. 306,727, Feb. 6, 1989, abandoned.

[30] Foreign Application Priority Data

| Feb. 9, 1988 | [JP] | Japan | 63-26628 |
| Jun. 14, 1988 | [JP] | Japan | 63-144683 |
| Jun. 28, 1988 | [JP] | Japan | 63-158101 |
| Oct. 4, 1988 | [JP] | Japan | 63-249120 |

[51] Int. Cl.$^5$ .......................... F23D 1/00; F23G 5/00
[52] U.S. Cl. .................... 110/347; 110/245; 122/4 D; 432/58
[58] Field of Search ............... 432/58, 15; 110/245, 110/347; 122/4 D

[56] References Cited

U.S. PATENT DOCUMENTS

| 4,017,585 | 4/1977 | Angevine et al. | 432/58 |
| 4,270,468 | 6/1981 | Robinson et al. | 122/4 D |
| 4,273,073 | 6/1981 | Robinson | 122/4 D |
| 4,279,205 | 7/1981 | Perkins et al. | 110/245 |
| 4,409,926 | 10/1983 | Moore | 122/4 D |
| 4,434,723 | 3/1984 | Brealey et al. | 122/4 D |
| 4,547,151 | 10/1985 | Takeda | 432/58 |
| 4,614,167 | 9/1986 | Bergkvist | 110/245 |
| 4,622,904 | 11/1986 | Murphy et al. | 110/245 |
| 4,682,567 | 7/1987 | Garcia-Mallol et al. | 110/245 |
| 4,788,919 | 12/1988 | Hohn et al. | 110/245 |

Primary Examiner—Henry C. Yuen
Attorney, Agent, or Firm—Finnegan, Henderson, Farabow, Garrett & Dunner

[57] ABSTRACT

An apparatus to be applicable as a boiler for incinerating wet refuse in a combustion chamber with a fluid and heat medium of solid particles fluidized by an air feed to form a fluidized bed, with the aid of combustion of auxiliary fuel effected below the fluidized bed, is provided with additional one or more adjacent upper fluidized fed chambers in series to have the wet refuse dried and partially incinerated in the lower primary fluidized bed chamber with the balance of the refuse in a form of unburnt carbon particles being forced to fly upward into the additional upper fluidized bed chambers and be incinerated therein. Heat recovery is carried out from a topmost fluidized bed chamber.

6 Claims, 5 Drawing Sheets

PROCESS AND APPARATUS FOR INCINERATING WET REFUSE

This application is a continuation of application Ser. No. 07/306,727, filed Feb. 6, 1989, and now abandoned.

BACKGROUND OF THE INVENTION

The present invention relates to a system for incinerating wet refuse, particularly to an improved process and apparatus incorporated in the system for incinerating wet refuse.

The term "wet refuse" as used herein refers mainly to manufacturing waste expelled from food production plants; for example, waste materials from barley and hops used by breweries, so called "beer dregs", or coffee grounds, orange pulp or tea leaves expelled from a canning plant involved. These plants also emit sludge and other waste products which fall into the category of "wet matter", and these products are treated in a similar manner.

DESCRIPTION OF THE RELATED ART

The above waste and sludge traditionally has been used as feed or fertilizer and the disposal thereof has never posed a problem. In the past few years, however, an increased production has brought increased waste and sludge yields, but inexpensive import feeds and fertilizers are now widely used. Accordingly, a supply and demand imbalance has arisen, and thus there is a large surplus of these wastes. These surpluses must be treated as industrial wastes, but the existing treatment methods are not satisfactory.

The least expensive treatment methods are to use the waste as land-fill or to dump it in the ocean, but obviously, these methods have limitations.

Various methods of an effective use of this waste have been developed, but a lack of profitability thereof has made some impractical, and the others are not able to solve the problem, due to inherent market limitations.

In this regard, attempts have been made to solve the problem by completely incinerating the wet refuse and using heat energy generated in an incinerator or furnace. The generated heat energy is utilized in the same way as that of a boiler or the like. A conventional means for incinerating the wet refuse as such is a single stage fluidized bed furnace consisting of a combustion chamber having a perforated bottom forming an air distributor, on which a fluidized bed of a fluid and heat medium of solid particles such as silica sands is formed due to air fed from below the distributor, and an air chamber adjacent to and below the combustion chamber, and communicated therewith through the distributor. The combustion chamber is provided with an inlet for introducing the wet refuse, and the air chamber is provided with an auxiliary burner and an inlet for air to be introduced therein for a combustion of auxiliary fuel from the burner, fluidization of the fluid and heat medium on the distributor, and incineration of the wet refuse.

In such a one stage fluidized bed furnace the wet refuse is completely incinerated, i.e., all of the refuse in the single combustion chamber is incinerated with the aid of the auxiliary fuel, in such a manner that a portion of the fed wet refuse is incinerated in the fluidized bed zone and the remaining refuse is incinerated in an upper space zone of the single combustion chamber.

With such a conventional single stage fluidized bed furnace, if all of the wet refuse can be incinerated in the single combustion chamber in a stationary state as desired, enough heat energy would be generated from the refuse per se to dry the wet refuse and keep the fluidized bed at a temperature of 800° C. or higher, with the aid of combustion of the auxiliary fuel. Such an incineration of all of the wet refuse however, means that the refuse must stay on the fluidized bed for long time, with the result that combustion waste gas must be discharged at a very low gas velocity. In this connection, the area of the perforated bottom of the single combustion chamber must be greatly enlarged, and thus the single stage fluidized bed furnace must be constructed on a considerably large scale.

To cope with this disadvantage of a need for a large-scale furnace, it can be assumed, for example, that the furnace is designed and operated to incinerate not full but 70% of the wet refuse in the single fluidized bed at an increased gas velocity. In this case, the temperature of the single fluidized bed would be lowered to, for example, 600° C., but such a temperature is not high enough to incinerate the contemplated 70% of the wet refuse in the fluidized bed by the combustion of the auxiliary fuel. As a result, the temperature of the fluidized bed is decreased due to the insufficient incineration of the refuse, and finally, the incinerating operation is forced to stop.

In connection with this, it is also assumed that, even if such a 70% incineration carried out in the single fluidized bed as above at the high gas velocity can be assured contrary to the above, the upper space zone of the single combustion chamber would allow only about 15% at most of the refuse to be incinerated therein by the heat energy generated from the 70% incineration of the refuse in the lower fluidized bed zone and the combustion of the auxiliary fuel in the air chamber. Accordingly, a problem would arise of how the balance, 15%, of unburnt refuse should be treated outside of the furnace, and treatment of this remaining refuse discharged from the furnace would be difficult.

Further, conventionally the wet refuse is fed into the combustion chamber by a pneumatic feeder, and a problem arises in such a pneumatic feed when the wet refuse has a high water content, in that the wet refuse will adhere to the internal surface of the feed conduit, due to an inherent high viscosity of the wet refuse, and as a result, the passage of the refuse in the conduit is gradually restricted until finally the conduit becomes clogged with the adhered refuse, and thus the refuse cannot be fed to combustion chamber through the conduit.

Further, the conventional incineration furnace of a single stage fluidized bed type can not be provided with a heat recovery means including heat exchange pipes disposed in the single combustion chamber, although it is assumed that if such a heat recovery means were incorporated in the combustion chamber, the generated heat energy could be recovered from the furnace at a considerably higher efficiency than that obtained by the provision of such a means outside of the furnace. This is because such a highly efficient heat recovery from the combustion chamber would stop the one stage fluidized bed furnace from incineration all of the wet refuse.

Note, there is a known multi-stage fluidized bed furnace or apparatus, whereby pulverized coal is burnt to generate heat energy for use in a boiler or the like or as a gasification apparatus, the coal is cracked to produce various gases and heavy oil.

SUMMARY OF THE INVENTION

The object of the present invention is to provide a process and apparatus for incinerating all of the wet refuse with the aid of an auxiliary fuel, as in the prior art, but which solves the above problems of the prior art arising when treating wet refuse fed continuously at a high feed rate.

Accordingly, an object of the present invention is to provide an improved method of incinerating wet refuse fed continuously at a high feed rate, using a compact device which is less expensive than that of the prior art, consumes less auxiliary fuel, and has a simple operation.

Another object of the present invention is to provide an improved method of recovering heat energy generated from the incineration of the wet refuse and the combustion of the auxiliary fuel, more efficiently that in the prior art, without obstructing a continuous incineration of the wet refuse fed into such a compact device.

A further object of the present invention is to provide an improved method of smoothly incinerating wet refuse by ensuring a continuous feed of the wet refuse into such a compact device.

According to the present invention, there is provided a process for incinerating wet refuse, with the aid of an auxiliary fuel, in a combustion chamber having a fluidized bed of solid particles formed therein, the process comprising:

(a) forming at least three adjacent chamber zones arranged vertically and in series, the two or more upper zones thereof having perforated bottoms and being provided with a fluid and heat medium of solid particles, which medium is fluidized to form a fluidized bed on each perforated bottom by gases fed continuously from below the chamber;

(b) continuously feeding air into the lower non-fluidized bed zone to cause a combustion and fluidization and through the upper fluidized bed zones via the perforated bottoms thereof, to be discharged from the topmost fluidized bed zone;

(c) continuously feeding wet refuse into the intermediate primary fluidized bed zone;

(d) continuously feeding auxiliary fuel into the lower non-fluidized bed zone, to cause a combustion of the fuel with a part of the fed air, whereby the combination of the air feed, refuse feed, and fluidization of the heat particle medium, has the following effect. Namely, sufficient heat energy is generated to dry the fed refuse and completely incinerate a predetermined portion of the dried refuse in the intermediate primary fluidized bed zone, the balance of the refuse being substantially formed of unburnt carbon particles of a size small enough to fly upward through the perforated bottom of the upper zone; i.e., the carbon particles are forced to move from the intermediate primary fluidized bed zone into one or more of a series of upper fluidized bed zones via the perforated bottoms thereof, and are incinerated therein. The generated heat energy combining with additional heat energy generated by incineration of the refuse per se with the remaining part of the fed air.

The process further comprises a recovery of the generated heat energy from the topmost fluidized bed zone.

According to the present invention about 70% to 80% of the refuse fed into the intermediate primary fluidized bed zone is incinerated therein, and the remaining unburnt portion of the refuse is forced to fly off therefrom and moved to one or more of a series of upper fluidized bed zones.

Preferably, the fluidized bed of the intermediate primary fluidized bed zone is kept at a temperature of from about 700° C. to 900° C.

In an embodiment of the present invention for a specific wet refuse which is relatively easy to burn, preferably three zones are formed: these zones being a lower non-fluidized bed zone wherein the auxiliary fuel is burnt; an intermediate primary fluidized bed zone wherein the wet refuse is partially incinerated; and a topmost fluidized bed zone wherein the remaining portion of the fed refuse is substantially incinerated, and at which the heat recovery is carried out.

In another embodiment of the present invention for another specific wet refuse, relatively not easy to burn, preferably four or more zones are formed as needed: these zones being a lower non-fluidized fed zone wherein the auxiliary fuel is burnt; an intermediate primary fluidized bed zone wherein the wet refuse is partially incinerated; one or more upper fluidized bed zones wherein the remaining portion of the fed refuse is substantially incinerated; and a topmost fluidized bed zone at which the heat recovery is carried out.

Further, according to the present invention, there is provided an apparatus comprises: two or more adjacent main chambers arranged vertically and in series, each having a perforated plate means on the bottom thereof for forming a fluidized bed of a heat medium of solid particles due to gases fed from below the zones and passing through the main chambers, the highest main chamber having a waste gas exhaust port; an auxiliary chamber provided adjacent to and below the lower or primary main chamber, with an air inlet provided, to carry out an auxiliary combustion therein; means for feeding air into the auxiliary chamber through the air inlet; an auxiliary burner disposed partially in the auxiliary chamber for feeding auxiliary fuel therein and burning same with the air therein; and means for feeding the wet refuse into the primary main chamber. The perforated plate means of the one or more main series of chambers subsequent to the primary main chamber allows small carbon particles to be carried therein from the primary main chamber by the gases produced when the refuse in burnt, to form carbon particles.

Preferably a means for recovering heat energy generated in the apparatus is further provided. This heat recovering means including heat exchange pipes having a liquid heat medium therein and incorporated with the topmost main chamber.

Preferably, the perforated plate means of each main chamber form sections of the heat exchange pipes with the liquid heat medium therein, and the refuse feeding means comprises a hopper and a screw feeder extending therefrom into the interior of the primary main chamber.

In an preferable embodiment wherein the topmost main chamber is a secondary chamber subsequent to the intermediate primary main chamber, the heat recovery means comprises a housing covering the topmost main chamber to form a surrounding space therebetween, and a means for feeding water as the liquid heat medium into the heat exchange pipes is provided. The waste gas exhaust port extends from the topmost main chamber to outside of the housing through the surrounding space. A combination of the housing and the topmost main chamber forms a section of the heat exchange pipes with the liquid heat medium therein.

The heat recovery means further may comprise a plurality of conduits transversing the interior of the highest main chamber and opening at the opposite ends thereof in the surrounding space. The conduits form sections of the heat exchange pipes with the heat medium therein.

Preferably, the heat recovery means further comprises means, provided at the top of the housing and partially disposed in a top part of the surrounding space, for separating steam from the water in the space and discharging the separated steam from the housing.

DESCRIPTION OF THE PREFERRED EMBODIMENTS

Figure 1:
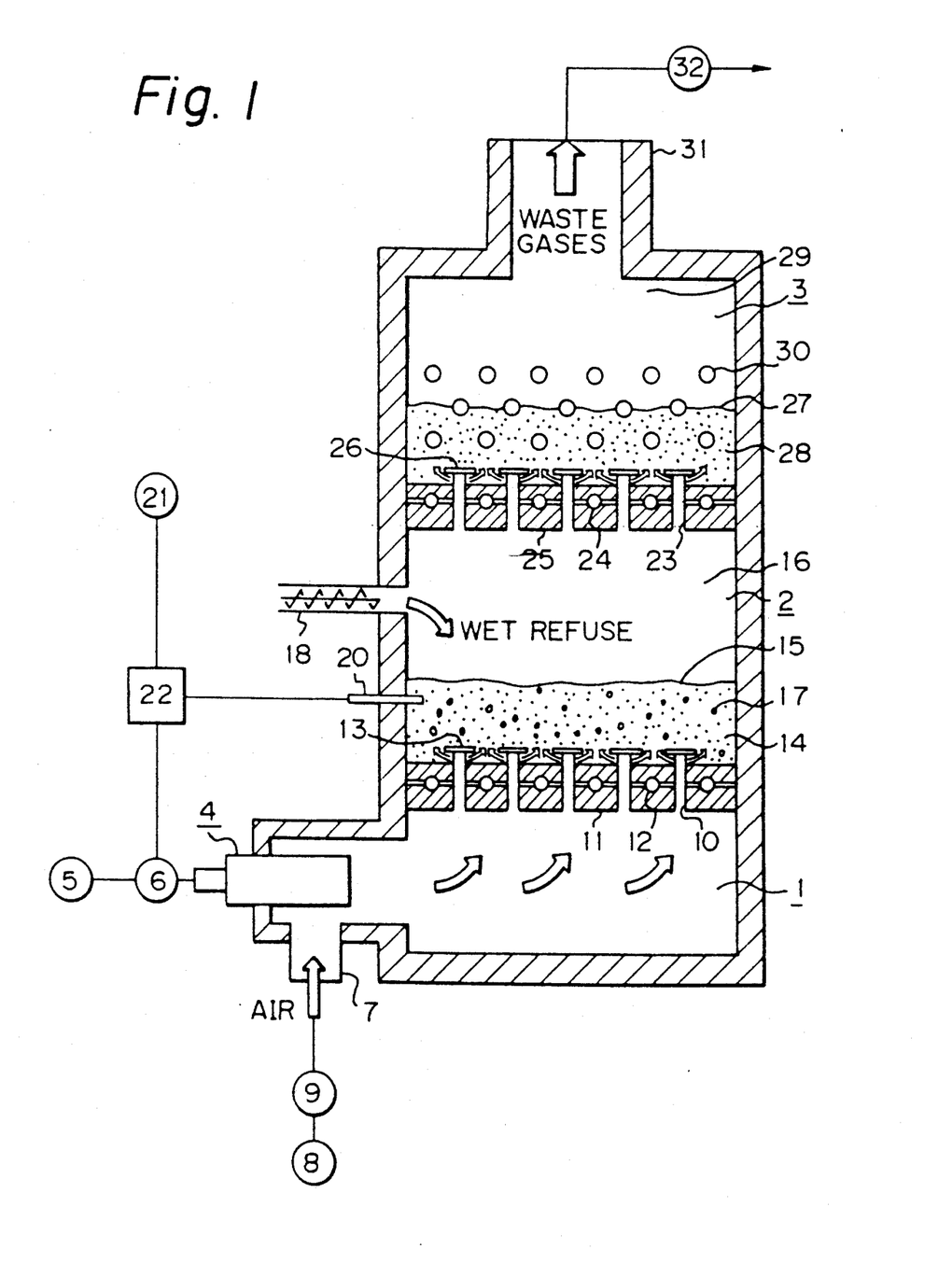
FIG. 1 is a diagrammatic sectional view showing a two stage fluidized bed type incineration apparatus according to the present invention.

Referring to FIG. 1, the apparatus of the present invention is a two stage fluidized bed type for incinerating wet refuse with the aid of an auxiliary fuel. The apparatus is a column type forming three adjacent chambers, i.e., a bottommost chamber 1, called an air chamber; an upper chamber 2, called an intermediate primary combustion chamber; and a topmost chamber 3, called a secondary combustion chamber. These chambers are separated by plate-like gas distributors, each forming a bottom of an upper chamber and a ceiling of a lower adjacent chamber. The distributors are formed by perforated plates 11 and 25 provided with pipes 10 and 23 vertically disposed in and extending from the perforations. The tops of the pipes 10 and 23 are provided with flat caps 13 and 26. Portions of the pipes 10 and 23 extending from the perforated plates 11 and 25 are perforated at the circumferential walls thereof. Numerals 12 and 24 denote heat exchange pipes disposed in the distributors. The air chamber 1 is provided with an auxiliary burner 4 extending into the chamber from the side wall thereof, and has an air inlet 7 provided below the burner 4 for feeding air. The perforations of the pipes 10 and 23 are large enough to allow not only gases but also unburnt carbon particles with ash produced from the incinerated wet refuse to pass through the perforations and move into an upper chamber, i.e., the secondary combustion chamber 3, while the below-mentioned fluid and heat medium of solid particles are not allowed to pass through the perforations of the pipes. Numeral 8 denotes an air source, 9 an air valve device for adjusting an air feed rate, 5 a fuel source for supplying heavy oil or fuel gas into the burner 4, 6 a device for adjusting a feed rate of the auxiliary fuel, and 20 a plurality of thermometers partially disposed in the primary combustion chamber 2, for detecting the temperatures of zones formed in the primary chamber. The detected temperatures are compared with predetermined values given by a temperature setting device 21 in a comparator 22. The comparator 22 generates signals to be sent to the fuel adjusting device 6 and the air valve device 9 so that the air feed rate and the fuel feed rate are controlled to maintain the temperature and combustion state in the primary combustion chamber 2 at a desired level.

The primary and secondary combustion chambers are provided with fluid and heat mediums 14 and 28 of solid particles, which are, for example, silica sands having an average size of 0.6 mm. The mediums 14 and 28 in the combustion chambers 2 and 3 ar fluidized by flue gas including air fed through the distributors, to form fluidized beds 15 and 27. In connection therewith, the caps 13 and 26 of the distributors prevent the fluidized heat medium particles from obstructing a smooth passage of the gas and the unburnt carbon particles or ash particles produced in a lower chamber into an adjacent upper chamber. When the fluidized beds are formed, the primary and secondary combustion chambers 2 and 3 form zones of the fluidized beds 15 and 27 and combustion space zones 16 and 29 thereon, respectively.

A screw feeder 18 is connected to the primary combustion chamber 2 at a side wall of the combustion space zone 16 to feed wet refuse 17 to be incinerated into the primary combustion zone 2. In this apparatus, the wet refuse enters the combustion space zone 16 and then is scattered and fluidized by the flue gas within the primary combustion chamber 2. The screw feeder 18 is provided with a hopper (not shown) wherein the wet refuse, which has been cut into small pieces, is stored before feeding it into the screw feeder 18.

A waste gas exhaust port 31 is provided at the top of the secondary combustion chamber 3, and communicates with the combustion space zone 29 and with a gas exhausting device 32 comprising a dust collector and a chimney.

Figure 4:
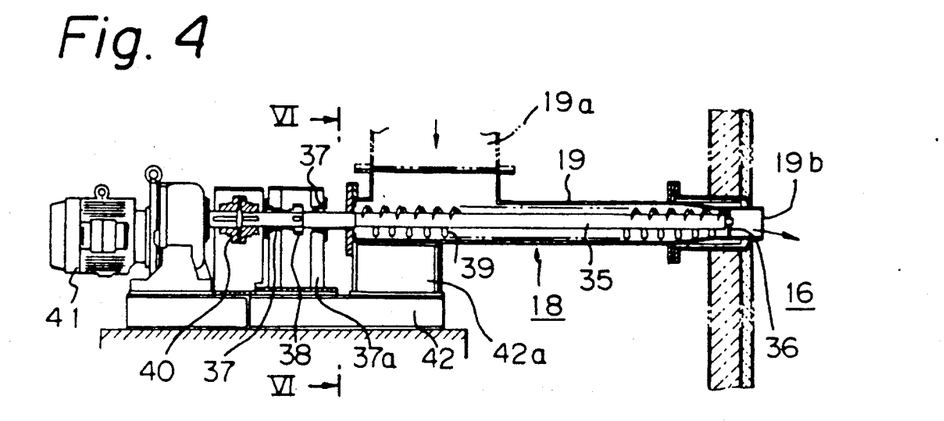
FIG. 4 is a partially sectional front view of a screw feeder provided in the apparatus as shown in FIGS. 1, 2 and 3.
Figure 5:
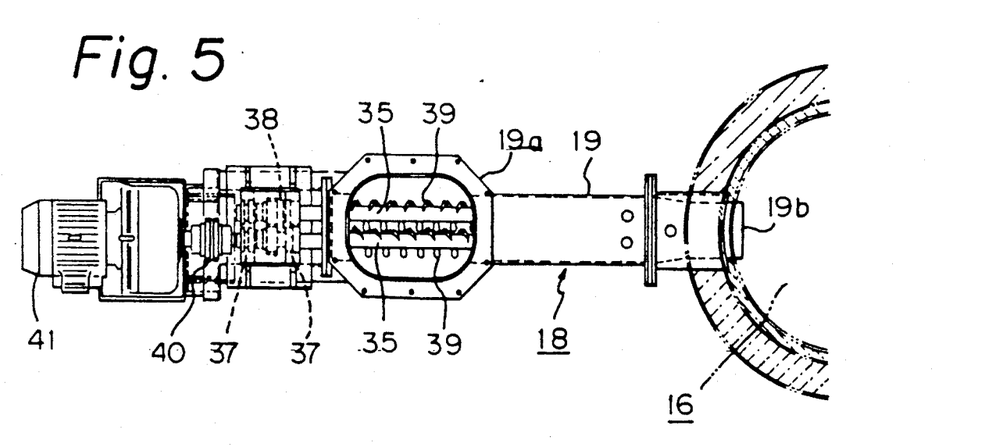
FIG. 5 is a plane view of the screw feeder as shown in FIG. 4.
Figure 6:
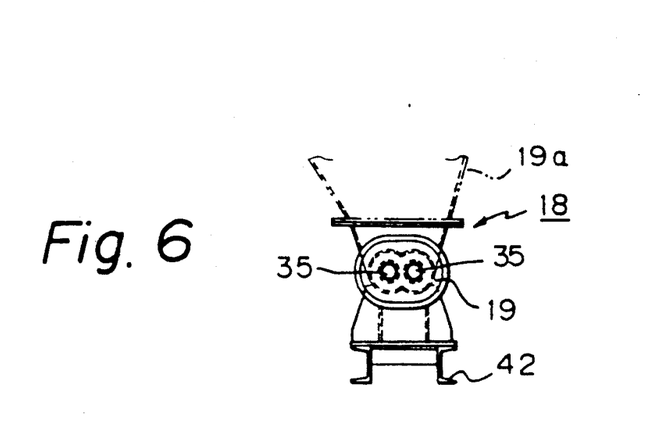
FIG. 6 is a cross-sectional view of the screw feeder taken along the line VI—VI of FIG. 4.

Referring to FIGS. 4, 5 and 6, the screw feeder 18 is a dual screw type, each screw being formed as a laterally extending shaft 35 having a plurality of radially and axially spaced paddles 39. Alternatively, the dual screws may form as threaded shafts. Each screw shaft 35 is disposed in a longitudinal casing and supported at one end by one of a pair of bearings 36 mounted in the casing, and at the other end by one of a pair of bearing 37 mounted outside of the casing, for rotation relative to the casing. The dual screws 35 are arranged in parallel so that the paddles of one screw mesh with the corresponding paddles of the other screw during rotation, and thus transport the wet refuse 17 from the hopper into the primary combustion chamber 2 through the casing 19. Numeral 19a denotes an inlet of the casing opening to the hopper via a device for adjusting a refuse feed rate (not shown), provided between the hopper and the feeder 18, and 19b denotes an outlet of the casing opening to the chamber 2. One end of each screw shaft 35 at a feed side of the casing 19 is connected to a reduction motor 41 via a coupling 40, and a spur gear 38 is provided between the pair of bearings 37 to mesh with the dual screw shafts 35. In this arrangement, the reduction motor 41 drives the dual screw shafts 35, via the coupling 40 and the spur gear 38, to rotate synchronously.

As shown in FIG. 5, the casing 19 is supported at one end by the apparatus at a furnace wall thereof, and at the other end on a common base 42 by a support 42a.

The reduction motor 41 and support 37a for the bearing 37 are commonly supported by the base 41.

When the small pieces of wet refuse 17 are fed continuously from the hopper into the primary chamber 2 by the screw feeder 18, the pieces are admixed with the fluid and heat medium particles and fluidized by air fed from the air chamber 1 through the gas distributor. When in this fluidized state, the fed wet refuse is dried and incinerated with the aid of the combustion of the auxiliary fuel in the air chamber 1.

Silica sand is preferable as the fluid and heat medium, since it has a heat capacity large enough to enable the primary combustion chamber 2 to be easily maintained at a desired temperature, and in a fluidized state, causes a uniform scattering of the small pieces of wet refuse within the fluidized bed 15 and forces ash out of the refuse in an incinerating process so that the refuse is assuredly in contact with the flue gas and an efficient and continuous incineration thereof is ensured.

Further, when small pieces of fresh wet refuse are introduced first in the upper space zone 16 of the primary combustion chamber 2, they are scattered in the space zone by the flue gas in combination with the dual screw feeder 18. The fresh wet refuse scattered over the fluidized bed 15 is then exposed to radiations including far-infrared radiation generated from the hot silica sand particles having a temperature of 700° C. to 900° C. with the effect that some parts of the wet refuse are forced to dry before dropping into the fluidized bed. This radiation drying process is provided to assist the primary combustion chamber 2, particularly the fluidized bed 15 in incinerating the introduced wet refuse effectively therein.

An appropriate number of spaced heat exchange pipes 30 are arranged laterally and vertically in the interior of the topmost or secondary combustion chamber 3, to extend horizontally therein. These heat exchange pipes are supplied with water as a liquid heat medium for effectively recovering heat energy generated by the incineration of the refuse and combustion of the auxiliary fuel with the air, in the form of hot water and/or steam.

With the apparatus having the fluid and heat mediums of silica sand denoted by 14 and 28 in appropriate amounts in the primary and secondary combustion chambers 2 and 3, respectively, the auxiliary burner 4 with the fuel continuously fed therein is ignited to effect continuous combustion of the fuel with air, while the air is continuously fed into the air chamber 1 from the air inlet 7 so as to cause the fluid and heat mediums 14 and 28 to be fluidized to form fluidized beds 15 and 27 in the primary and secondary combustion chambers 2 and 3, and is discharged from the waste gas exhaust port 31. After the fluidized bed 15 is heated to a predetermined high temperature, continuous feed of small pieces of the wet refuse 17 into the primary combustion chamber 2 is commenced. In a stationary state, the refuse feed, the auxiliary fuel feed, and the air feed are controlled so that the fluidized bed 15 in the primary combustion chamber 2 is heated and held at a temperature of from 750° C. to 900° C., with the following effect. All of the wet refuse fed is dried and then incinerated with the air to an extent such that a predetermined portion of the dried refuse, for example, 70% of the dried refuse, is completely incinerated with the air in the fluidized bed 15, and another predetermined portion of the dried refuse, for example, 10% of the dried refuse, is completely incinerated with the air in the combustion space zone 16, while the balance of the refuse forms unburnt carbon particles small enough to fly upward through the perforations of the gas distributor. The balance, for example, 20% of the refuse in the form of unburnt carbon, is forced to fly from the primary combustion chamber 2 into the secondary combustion chamber 3 by the air together with the produced gases and ash. In the secondary combustion chamber 3, the refuse remaining as unburnt carbon particles is incinerated with the air in both the fluidized bed 27 and the combustion space zone 29, with the result that the wet refuse 17 is finally substantially fully incinerated with the air in the combustion chambers 2 and 3 with the aid of the auxiliary fuel.

Note, assuming that a complete incineration of the wet refuse is effected only in the intermediate primary combustion chamber 2, contrary to the present invention, at the same refuse feed rate, air feed rate and fuel feed rate as in the present invention, i.e., a 80% incineration in the intermediate primary combustion chamber 2 and a 20% incineration in the secondary chamber 3, the produced waste gas must be discharged at a very low gas velocity or furnace superficial velocity in the intermediate primary combustion chamber 2, for example, one fourth of the gas velocity obtained in the present invention. To cope with such an assumed low gas velocity at the same air feed rate as that of the present invention, the area of the floor of the fluidized bed 2 or the perforated bottom of the primary combustion chamber 2 must be enlarged accordingly, and thus the apparatus must be enlarged in the horizontal cross-sectional scale. Further, a specific fluid and heat medium of solid particles must be determined such that the low gas velocity enables the determined medium to form a stable fluidized bed on the enlarged perforated bottom.

In the apparatus of the present invention, if only 80% of the wet refuse were incinerated and 20% of the unburnt refuse were discharged from the apparatus, the incineration efficiency would be very low. Nevertheless, according to the present invention, this 20% of unburnt refuse forming carbon particles is incinerated in the secondary combustion chamber 3, and thus a very high incineration efficiency is obtained and the residue is in an amount almost corresponding to that of the ash content of the fed refuse.

According to the present invention, sufficient heat energy is generated by a combination of combustion of the auxiliary fuel by means of the burner 4 in the air chamber 1 and incineration of the wet refuse, in a stationary state, to dry the wet refuse and then incinerate same partially in the intermediate primary combustion chamber 2 and partially in the secondary combustion chamber 3. The heat medium of solid particles forming the fluidized beds 15 and 27 in the primary and secondary combustion chambers 2 and 3 holds the heat energy in the combustion chambers to an extent sufficient to maintain the temperatures required to completely incinerate the wet refuse at a predetermined refuse feed rate. Further, the fluidized particles accelerate the incineration by a positive contact with the refuse, and thus a removal of ash from the refuse is assuredly accomplished during the incineration process.

Accordingly, in the above apparatus, heat energy other than that required to maintain the combustion chambers at a temperature needed to incinerate the refuse, is continuously generated and the refuse is continuously fed. According to the present invention, this surplus heat energy is recovered mainly from the interior of the topmost chamber or the intermediate secondary combustion chamber 3 by heat exchange pipes containing water therein as a heat medium and partially disposed in the secondary chamber 3. Some of the surplus heat energy is recovered from the gas distributors in the primary and secondary combustion chambers in which sections of the above mentioned heat exchange pipes 30 are arranged, i.e., the pipes 12 and 23. The heat medium of solid particle fluidized in the secondary combustion chamber 3 assists not only the incineration of the refuse but also the recover of the surplus heat energy, due to a positive contact with the sections of the heat exchange pipes disposed in the secondary combustion chamber 3. In this connection, according to the present invention, the surplus heat energy can be continuously recovered in the form of hot water or steam, while the waste gases are exhausted continuously from the gas exhaust port 31 after the heat energy of the gases has been recovered by the heat exchange pipes 30. For example, a heat transfer efficiency of not less than 250 Kcal/m$^2$·h·C° is attained in the incineration of the present invention.

The primary combustion chamber 2 may be provided with heat exchange pipes, as of the secondary combustion chamber 3, but preferably a substantial amount of the heat energy is not recovered from the interior of the primary combustion chamber 2, since the primary combustion chamber 2 must supply the wet refuse with a relatively large amount of heat energy, to completely dry the refuse. The heat recovery should be carried out in the secondary combustion chamber 3, since incineration of the refuse is completed in the secondary combustion chamber 3.

Note, since the apparatus of the present invention can recover the surplus heat energy at a high efficiency, it can be preferably used in a steam boiler or a hot water boiler incorporating the heat exchange pipes 30.

With respect to the wet refuse, coffee grounds have a 60% to 70% water content, and orange pulp, waste material expelled by breweries, i.e., "beer dregs", and tea leaves, each have a water content of 70% to 90%. Sludge has a water content of 70% to 80%. Namely, this wet refuse has a high water content, and a high viscosity. According to the present invention, the dual screw feeder 18 is used, and in this connection, such wet refuse is easily fed continuously and smoothly into the apparatus due to operation of the dual shafts having the paddles 39, with the result that the apparatus can be operated in a stable manner. Each of such dual shafts may have spaced helical threads or blades or integrated helical blade instead of the paddles 39 shown in FIGS. 4 to 6. Preferably, the type of screw feeder provided is determined in view of the kind and characteristics of the wet refuse to be incinerated.

With respect to scale of the apparatus according to the present invention, horizontal cross-sectional areas of the apparatus are advantageously reduced in the chambers 1, 2 and 3, compared to the single fluidized bed type prior art apparatus, at the same refuse feed rate, and thus the apparatus is relatively small and compact.

Figure 2:
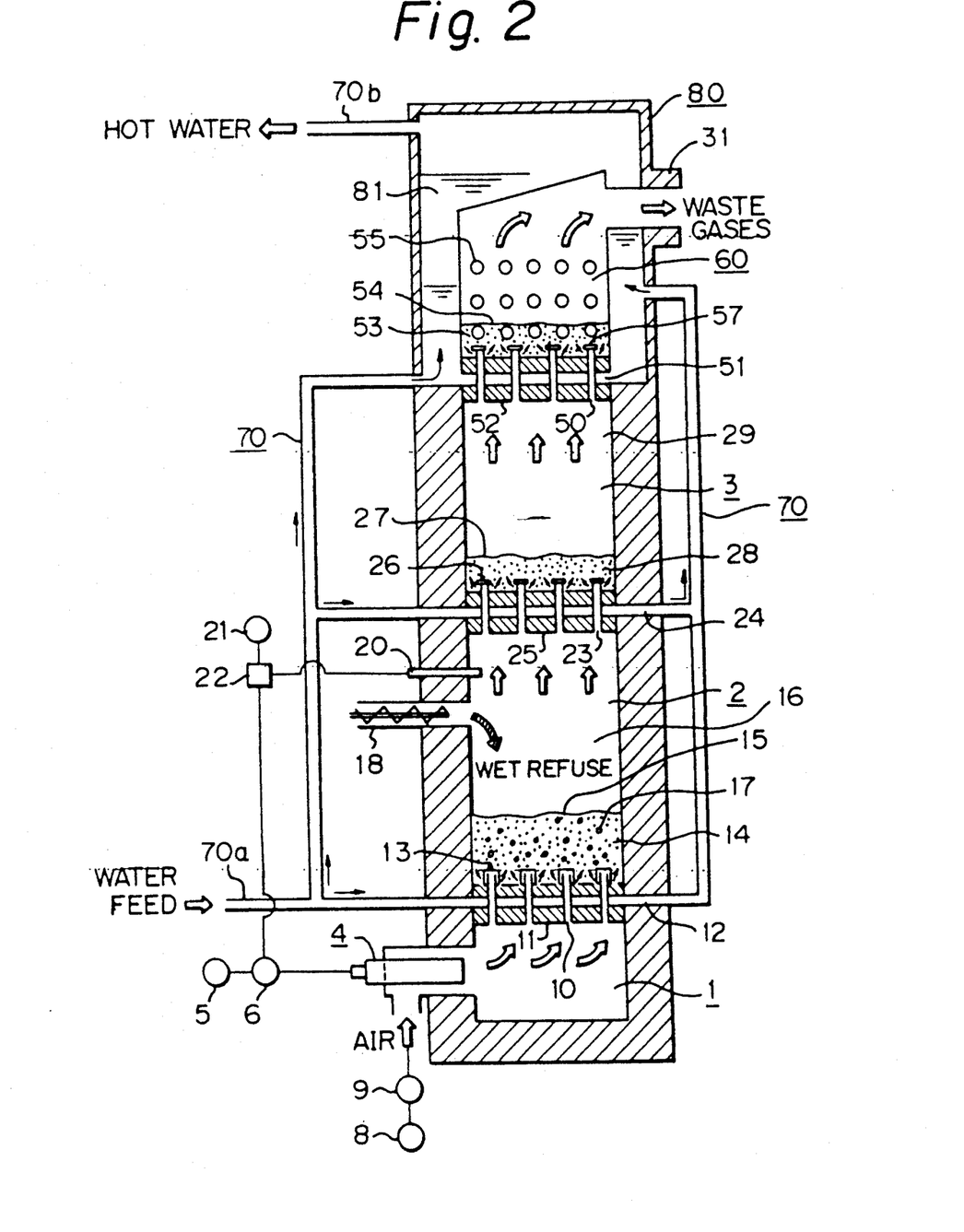
FIG. 2 is a view corresponding to FIG. 1, showing a three stage fluidized bed type incineration apparatus according to the present invention.
Figure 3:
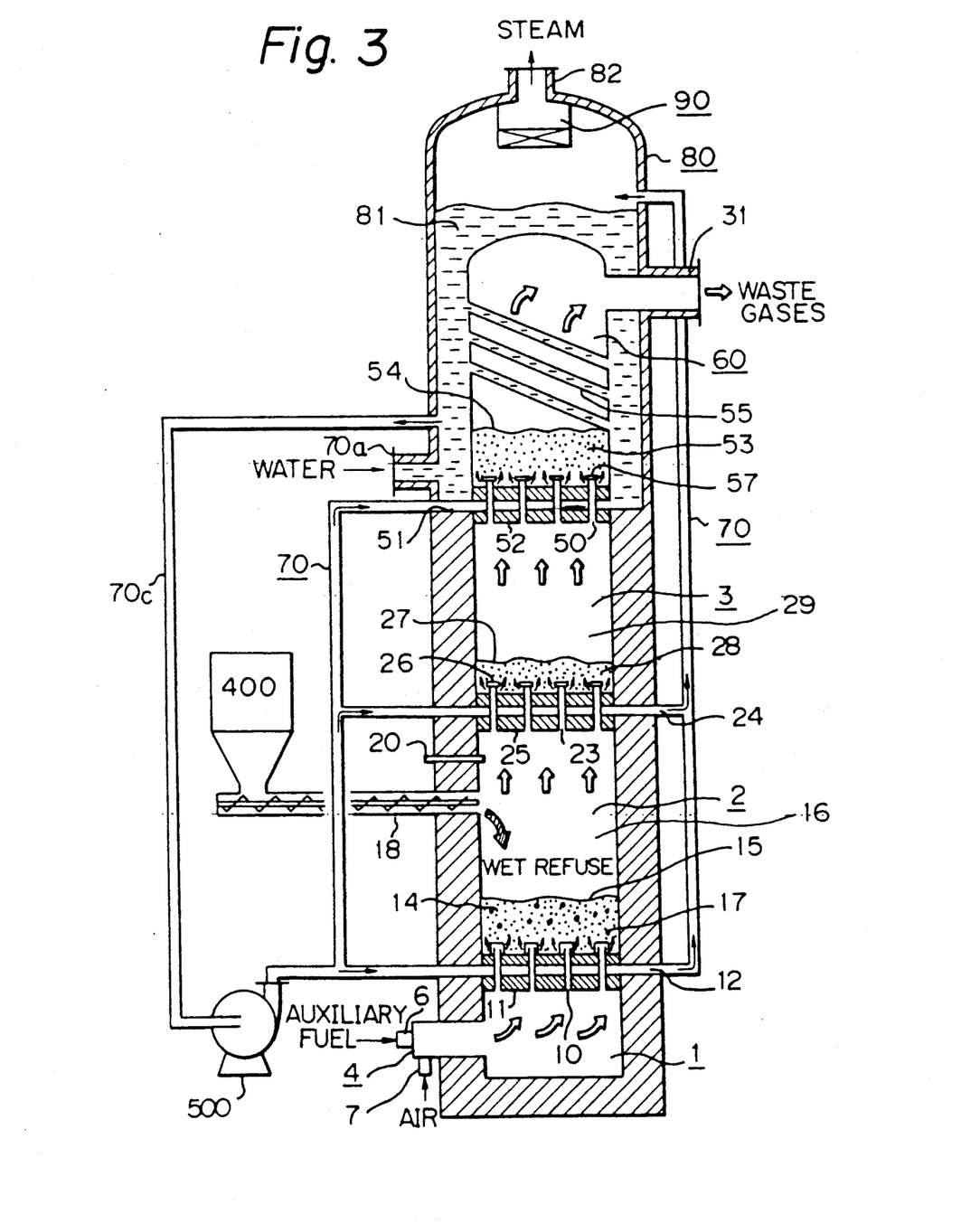
FIG. 3 is a view corresponding to FIGS. 2 showing another three stage fluidized bed type apparatus according to the present invention.

FIGS. 2 and 3 show other embodiments of the apparatus of the present invention, having three stage fluidized beds of solid particles, and FIG. 1 shows an apparatus having two stage fluidized beds.

Referring to FIGS. 2 and 3, the same numerals as those used in FIG. 1 denote the same members or elements. The substantial differences in the arrangement of the apparatuses of FIGS. 2 and 3 are that the apparatuses of FIGS. 2 and 3 have an additional upper combustion chamber 60 arranged in series on the air chamber 1, primary combustion chamber 2 and secondary combustion chamber 3 corresponding to those of the apparatus shown in FIG. 1. This additional chamber 60 forms the topmost chamber having heat exchange pipes 55 partially disposed therein, and the secondary combustion chamber 3 of FIGS. 2 and 3 has no heat exchange pipes therein. Namely, the additional combustion chamber 60 corresponds to the secondary combustion chamber 2 of FIG. 1 in that it has a gas distributor formed by a perforated plate 52 with the heat medium of solid particles 53 with pipes 50 and caps 57 therein, which medium is fluidized by the flue gas to form a fluidized bed 54. The perforated plate 52 has elements 51 of the heat exchange pipes 55, corresponding to the conduits 11 and 24 in the primary and secondary combustion chambers 2 and 3.

With the two apparatus of FIGS. 2 and 3, the wet refuse 17 is dried and partially incinerated in the primary combustion chamber 2, as in the apparatus shown in FIGS. 1, and the balance of the refuse forming unburnt carbon particles is incinerated mainly in the secondary combustion chamber 3 and the remaining portion of the refuse in a form of carbon particles, if any, is incinerated in the topmost or third combustion chamber 60. These apparatuses are preferably used when incinerating wet refuse which is not relatively easy to burn. Further, these apparatuses are advantageous in that the secondary combustion chamber 3 incinerates the unburnt carbon particles coming from the primary combustion chamber 2 as the balance of the refuse, and substantially no heat energy is recovered from the secondary combustion chamber 2, and thus the remaining refuse is incinerated more efficiently than in the secondary combustion chamber 2 of FIG. 1. Another advantage is that the topmost chamber or third combustion chamber 60 can recover the generated heat energy without the need to incinerate the refuse, which would require some of the generated heat energy. In this regard, the apparatuses of FIGS. 2 and 3 are provided with a stronger heat recovery means than that of FIG. 1, to recover the surplus heat energy more efficiently.

Referring to FIG. 2, the apparatus is provided with a heat recovery means for recovering the heat energy in the form of hot water, which comprises heat exchange pipes 55 disposed in the interior of the topmost chamber 60, and a housing 80 covering the topmost chamber 60 to form a surrounding space 81. The heat recovery means includes a pipeline system 70 forming, as elements thereof, the conduits 12, 24 and 51 disposed in the perforated plates 11, 25 and 52, the pipes 55 in the topmost chamber 60, and the surrounding space 81. 70a denotes an inlet portion of the pipe line system from which water is fed as a liquid heat medium; and 70b is an outlet portion of the pipe line system for supplying hot water to utility equipments.

A waste gas exhaust port 31 is provided at the topmost chamber 60 and extends out of the housing 80 through the surrounding space 81.

As is obvious, the apparatus of FIG. 2 is designed to form a hot water boiler. The pipes 55 may be extended transversely into the interior of the topmost chamber 60, and open at the opposite ends thereof to the surrounding space 81, to enhance the heat recovery efficiency. Note, the pipes 55 may be omitted, if unnecessary. Alternatively, the apparatus may be modified to form a steam boiler, wherein the heat recovery means is a pipe line system excluding the housing 80 but wherein the pipes 55 communicate with the inlet and outlet portions of the system 70a and 70b.

The apparatus of the present invention features a high incineration load or capacity of the furnace. In general, a conventional furnace or boiler of a single stage fluidized bed type, wherein a wet refuse is incinerated, can have a larger incineration capacity than that of a non-fluidized bed boiler due to a high feed velocity of the refuse, but it requires a furnace superficial velocity of gases high enough to fluidized a fluid and heat medium. The high superficial gas velocity causes most of the unburnt carbon particles to be forced to fly out of the apparatus being considerably large with the result that a combustion efficiency is lowered.

In contrast, the boiler of the present invention enable the refuse to be burnt with a high incineration load without lowering the combustion efficiency, since a secondary fluidized bed chamber is provided so that it can catch or trap such flying carbon particles therein.

For example, so called "beer dregs" have a caloritic heat of 5131 Kcal/dry kg and its solid part contains 48.86% of carbon, 6.61% of hydrogen, 37.14% of oxygen, 3.23% of nitrogen, 0.58% of sulfur and 3.28% of ash, and the water content ranges from 75% to 83%.

In the case of wet beer dregs containing 75% of water, a three stage fluidized bed type boiler of the present invention as shown in FIG. 2 may be operated to attain a combustion efficiency of not less than 99%, a furnace load of not less than 400 Kg/hr·m$^2$ and a NOx value of not more than 150 ppm (a conversion value calculated relative to 6% of O$_2$) under the following optimum condition:

Oxygen concentration of waste gases: 7.0 to 8.0 dry vol. %

Temperature of the primary fluidized bed: 750° to 800° C.

Depth of sand in a static state, which is used to form the primary fluidized bed: not less than 250 mm Depth of sand in a static state, which is used to form the secondary fluidized bed: not less than 100 mm The combustion conditions were determined, considering public air pollution requirements that NOx generated by incineration must be limited to less than a specific level, although the higher the bed temperature and the oxygen concentration needed to increase the combustion efficiency, the higher the level of NOx which is generated.

An embodied three stage fluidized bed broiler as shown in FIG. 2 was designed such that each of the bed floor has an area of 0.8 m$^2$ (a rectangular shape), the primary combustion chamber is 2000 mm in height and the secondary combustion chamber is 1500 mm in height, and operated under the following combustion conditions, and attained an overall combustion efficiency was 99.6%.

Sand depth in the primary combustion chamber in a static state: 300 mm

Sand depth in the secondary combustion chamber in a static state: 100 mm

Temperature of the primary fluidized bed: 800° C.

Oxygen concentration of the waste gases: 7.5 dry Vol. %

Furnace load or capacity: 430 kg/hr·m$^2$

The overall combustion efficiency was distributed in the primary and secondary combustion chambers as follows:

74.5% in the primary fluidized bed
10.0% in the primary upper space zone
84 5% in total in the primary combustion zone
15.1% in the secondary fluidized bed zone When the furnace load in the above embodied conditions was decreased from 430 kg/hr·m$^2$ to 300 kg/hr·m$^2$, the overall combustion efficiency was not less than 99.9% with a local efficiency of not less than 82% in the primary fluidized bed.

As explained above, the present invention can attain a high combustion efficiency at a high furnace load, i.e., a high refuse feed rate According to the present invention, the refuse feed rate may be from 300 to 500 kg/hr·m$^2$.

Referring to FIG. 3, the apparatus forms a steam boiler having a heat recovery means similar to that of FIG. 2, wherein the same numerals denote the same elements or members as those of FIG. 2. The differences in the arrangement of the heat recovery means of FIGS. 2 and 3 are that the heat recovery means of FIG. 3 has a pipe line system 70 including an additional pipe element 70C and a pump 500, in combination with the other pipe elements, to form a water recycling system, but the heat recovery means 70 of FIG. 2 does not form such a water recycling system, and in that the housing 80 of FIG. 3 is provided with a steam/water separator 90 suspended from the ceiling of the housing 80, and a steam outlet 82 at the top of the housing 80 communicating with the steam/water separator 90, instead of the hot water outlet 70b of FIG. 2.

In the steam boiler of FIG. 3, the heat energy is recovered in the form of saturated steam at a pressure of, for example, 10 kg/cm$^2$, from the steam/water separator 90. The surrounding space 81 forms a lower saturated water zone and an upper steam zone wherein the separator 90 is located. Steam bubbles are produced in the heat exchange pipes 55 and rise into the steam zone through the water zone. In the separator 90, steam is completely separated from saturated hot water carried by the steam and discharged from the steam outlet 82, and the separated saturated water is returned to the water zone.

The pipes 55 traversing the interior of the highest chamber 60 are preferably inclined at an angle relative to a horizontal line, for example, 5° to 45°, so that the natural convection of the waste gases and the fluidization of the heat medium of solid particles can be utilized in the topmost chamber 60 so that the heat energy is effectively recovered from the waste gases and the heat medium particles.

The pipes 55 may be provided with fins, to increase the heat recovery efficiency.

Figure 7:
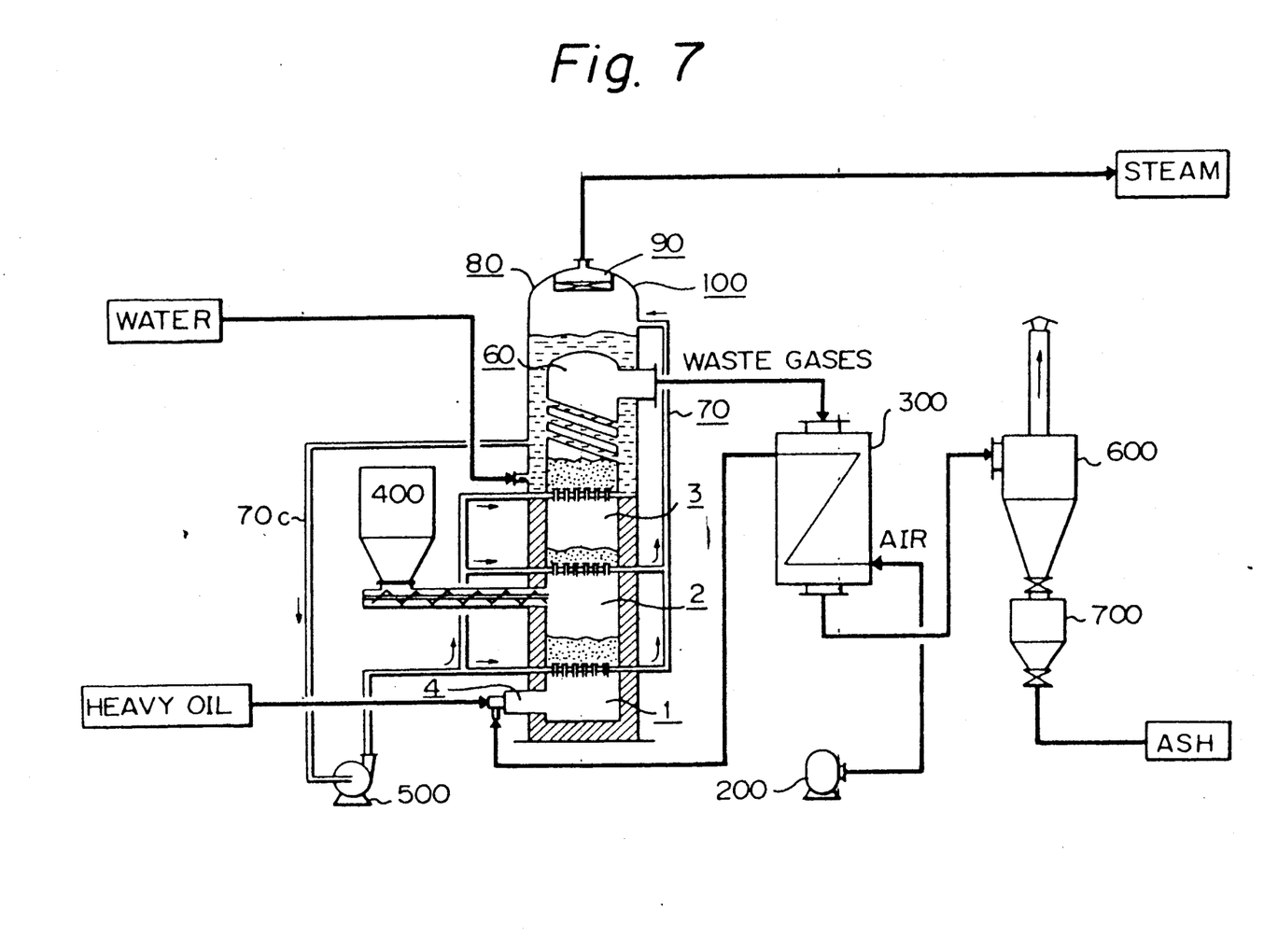
FIG. 7 is a diagrammatic view showing an incineration system incorporating the apparatus of FIG. 3, according to the present invention.

The above three stage fluidized bed type steam boiler as shown in FIG. 3 is incorporated with other equipment to form an entire boiler system, as shown in FIG. 7.

Referring to FIG. 7, the boiler system is composed of a boiler body 100 which comprises the apparatus of FIG. 3 including the wet refuse hopper 400 and the pump 500, an air heater 300 with a blower 200 for feeding air into the boiler body, a dust collector 600, and an ash hopper 300.

In the boiler system of the present invention, fresh air is introduced by the blower 200 into the air heater, and the air is heated by the waste gases introduced from the boiler body 100. The heated air is fed into the boiler body for combustion of the heavy oil as an auxiliary fuel, and for fluidization of the heat medium of solid particles forming the three stage fluidized beds, fresh water is fed into the heat exchange pipeline system of the boiler, and the wet refuse is fed from the hopper 400 to the boiler body through the screw feeder 18. The waste gas is forced to pass through the air heater while some of the heat energy is recovered by the fresh air, and to flow into a cyclone type dust collector 600, where the dust, which is mostly ash carried by the waste gases, is separated from the gases and discharged into the ash hopper 700, and the separated gases are exhausted through a chimney into the atmosphere. The steam produced by the boiler body 100 through the steam/water separator 90 is supplied to utility equipments.

A conventional boiler system comprises a boiler body and a separate steam drum provided to separate steam from saturated hot water, and the steam with hot water carried thereby is produced by the boiler body and introduced into the steam drum. Namely, according to the prior art, the steam drum must be provided, but this is not necessary for the boiler system of the present invention, as apparent from FIG. 7.

In this connection, the boiler system of the present invention is advantageous in that the boiler body 100 as shown in FIG. 3 and FIG. 7 is compact and small scale and a steam drum is not required, and thus the boiler system is compact and small scale as a whole. A means for exerting the same function as that of the steam drum is provided in the apparatus of FIG. 3. In other words, according to the present invention, the housing 80, the separator 90, and the topmost chamber 60, in combination, replace the steam drum in the boiler body per se, and thus the boiler system including a three stage fluidized bed apparatus of the present invention as shown in FIG. 3 requires less piping with heat insulators provided and is compact, and thus to area occupied by the boiler system is reduced and installation of the boiler system is easier compared to the prior art boiler system.

We claim:

1. A process for incinerating wet refuse containing not less than 60% water and having a size of not more than 30 mm in a combustion chamber having a fluidized bed of solid particles formed therein, comprising:
   (a) forming at least three adjacent chamber zones arranged vertically and in series, two or more upper zones thereof having perforated bottoms and being provided with a fluid and heat medium of solid particles, said medium being fluidized to form a fluidized bed on each perforated bottom by gases fed continuously from below said zones;
   (b) continuously feeding air into the lower non-fluidized bed zone to cause a combustion and fluidization, and through the upper fluidized bed zones via the perforated bottoms thereof, to be discharged from a topmost fluidized bed zone;
   (c) continuously feeding wet refuse into an intermediate primary fluidized bed zone;
   (d) continuously feeding auxiliary fuel into the lower non-fluidized bed zone to cause a combustion with a part of the fed air, whereby a combination of said air feed, said refuse feed, and said fluidization of the heat particle medium, generates sufficient heat energy to dry the fed refuse and incinerate 70% to 80% of the dried fed refuse in said intermediate primary fluidized bed zone; the balance of said refuse being in a form of unburnt carbon particles having a size small enough to move upward through said perforated bottoms, said carbon particles being forced to move from said intermediate primary fluidized bed zone into one or more of said upper fluidized bed zones and to be incinerated therein, said generated heat energy combining with additional heat energy generated by an incineration of the refuse with a remaining portion of the fed air.

2. A process for incinerating wet refuse according to claim 1, further comprising a recovery of the generated heat energy from the topmost fluidized bed zone.

3. A process of incinerating wet refuse according to claim 2, wherein the fluidized bed of said intermediate primary fluidized bed zone is kept at a temperature of from 700° C. to 900° C.

4. A process of incinerating wet refuse according to claim 1, 2 or 3, wherein the wet refuse is fed continuously into said intermediate primary fluidized bed zone at a rate of from 300 to 500 Kg/hr·m².

5. A process for incinerating wet refuse according to claims 1, 2 or 3, wherein at least three of said zones are formed, said zones being a lower non-fluidized bed zoned wherein the auxiliary fuel is burnt; an intermediate primary fluidized bed zone wherein the wet refuse is partially incinerated; and a topmost fluidized bed zone wherein a remaining portion of the fed refuse is incinerated, and from which heat is recovered.

6. A process for incinerating wet refuse according to claims 1, 2 or 3, wherein at least four of said zones are formed, said zones being a lower non-fluidized bed zone wherein the auxiliary fuel is burnt; an intermediate primary fluidized bed zone wherein the wet refuse is partially incinerated; an upper fluidized bed zone wherein the remaining portion of the fed refuse is incinerated; and a topmost fluidized bed zone from which heat is recovered.

* * * * *